Figure 1:
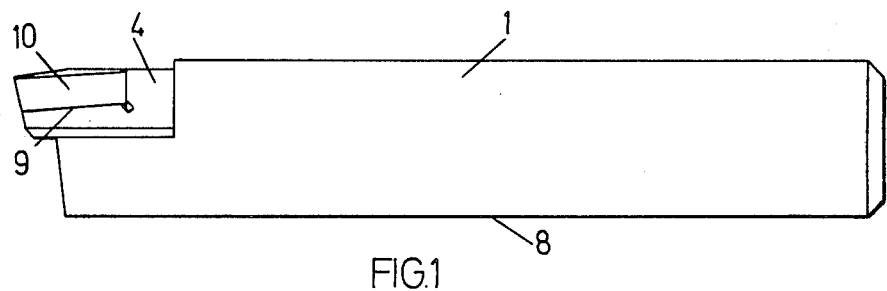

United States Patent [19]
Pataky

[11] 3,885,282
[45] May 27, 1975

[54] MACHINING TOOL

[76] Inventor: Josef Pataky, Nordliche Lohstrasse 19, D-4150 Krefeld, Germany

[22] Filed: Oct. 23, 1973

[21] Appl. No.: 408,734

[52] U.S. Cl. .................................................. 29/98
[51] Int. Cl. ............................................. B26d 1/00
[58] Field of Search .................................. 29/96, 98

[56] References Cited
UNITED STATES PATENTS

| | | | |
|---|---|---|---|
| 872,760 | 12/1907 | Schulz | 29/98 |
| 1,009,352 | 11/1911 | Stutzman | 29/98 |
| 2,346,084 | 4/1944 | Sanoki | 29/98 |
| 2,523,450 | 9/1950 | Rossetti | 29/98 |
| 2,799,917 | 7/1957 | Anania | 29/98 |
| 2,831,241 | 4/1958 | Bader et al. | 29/96 |
| 2,982,008 | 5/1961 | Facknitz | 29/96 |
| 3,520,042 | 7/1970 | Stier | 29/98 |

FOREIGN PATENTS OR APPLICATIONS

| | | | |
|---|---|---|---|
| 717,941 | 10/1931 | France | 29/98 |
| 72,661 | 6/1916 | Switzerland | 29/98 |

Primary Examiner—Harrison L. Hinson
Attorney, Agent, or Firm—James N. Blauvelt

[57] ABSTRACT

A machining tool comprising a holder and an insert for carrying a cutting tool or bit, the insert being attachable to the holder by means of a conical recess in the insert, a clamping member which fits into the recess and a screw with opposite handed threads which screws into bores in the clamping member and the holder respectively.

8 Claims, 7 Drawing Figures

MACHINING TOOL

This invention relates to a machining tool comprising a holder and an insert to which a cutting tool can be attached, the insert being adapted to be rotatably mounted in a recess in a holder and to be fixed by means of a locking screw in a desired position relative to the holder.

Such a tool affords the possibility, of altering the tip working angle. By this means it can be set up for the machining of workpieces of different shapes or for different cutting operations.

Objects of the invention are to provide a further development of such a tool and to evolve a design which is suited to practical requirements, is of simple design, of compact and rigid construction and easy to manipulate, is capable of versatility of application and at the same time allowing the cutting tool to be rapidly and easily changed while the tip working angle can also be altered.

To this end, the invention provides in the insert in addition to a bearing surface for the cutting tool an outwardly flared recess for a tapering gripping member fixed by means of a threaded device and so mounted in the insert that the gripping member can engage the cutting tool unilaterally, the threaded device for securing the gripping member being formed by the fixing screw itself, by means of which the insert can be firmly clamped in the holder and the cutting tool clamped in the insert. The gripping member may more particularly be of conical shape or in the form of a wedge, optionally a rounded wedge.

With a tool of the above design the cutting edge can quickly be fixed in position and despite the quick and easy adjustment of the cutting angle and replacement of the cutting tool it remains stable and rigid, so that it can also be set up for high cutting capacity.

Carbide cutting tools for metal turning purposes or ceramic cutting tools or other cutting members may for example be used in the tool bit. The design of the rotatable insert can be modified in various ways for the purpose of holding the cutting tools without detriment to the principle and the fundamental design of the invention. Thus, for example, it can be modified to accommodate cutting tools of triangular, rectangular or any other geometrical shape. Owing to the simple mode of fixing the insert in the holder it is also possible to equip a holder to accommodate various different replaceable inserts, which differ among themselves in respect of the shape of the front bearing portion for the cutting tool.

The tool according to the invention may be used with a lathe and may in such case be useful particularly for copying lathe work, and for use in center-less machines and in metal machining stations. It may also however be used as a boring bar or as a part thereof, as a tool to be used with boring and milling machines or it may be designed as a tool for other metal cutting work, the aforesaid advantages being achieved in every case.

In one embodiment of the tool especially adapted for lathe work, two abutments are provided for supporting the cutting tool which is to be gripped in position, one of said abutments being in the form of a bolt, peg or the like engaging through a hole in the cutting tool and the other abutment being in the form of a fixed bearing surface. In setting up the tool the fixed bearing surface is positioned at the side of the recess for the gripping member, so that the site where the gripping member engages the cutting tool and the fixed bearing surface for said tool face the same side of the cutting tool and the bolt forms a point of leverage. By this means rapid and reliable fastening of such cutting tools, that is to say tools for metal turning purposes provided with a central aperture, is achieved.

The gripping or clamping device may be the clamping screw itself, in which case the head or the shank of the latter is provided with a conical portion. The clamping device may also have a through-hold for the clamping screw, the head of which comes to bear against the end of the clamping device. In both cases clamping may be effected either by passing the clamping screw or bolt through the hole in the holder, and straining it against the latter by means of a nut, or by means of the hole in the holder being a tapped hole, in which the correspondingly threaded fixing screw can be screwed. The latter alternative is generally a suitable method. The tapering shape of the clamping member, for example its conicity, may be chosen such that its automatic tendency to bind in the hole precludes any unintentional slackening of the fixing screw.

In a preferred mode of construction, the fixing screw has two threads of opposite hand, that is to say a right-handed and a left-handed thread, one of which engages in a tapped hole in the holder and the other in a tapped hole in the clamping member. This produces an effective application of force and the necessary clamping adjustment is minimal. In order to achieve specially high clamping force, the pitch of the two threads is preferably different, so as to transmit force between them.

The boundary portion of the insert, which comes to lie within the recess in the holder, may be for example of cylindrical shape. It may however be of advantage to provide this portion of the boundary of the insert with a conical surface, in which case the recess in the holder is also of corresponding conical shape.

An attachment may also be provided on the insert adapted to engage in a tapped hole or recess in the holder, producing a centering and guiding effect and increasing the rigidity of the assembly.

The bearing provided on the insert for the cutting tool may either be parallel to a bearing surface of the holder or may be inclined thereto in one or two directions, in known manner per se, so as to produce an appropriate angle of tilt for the cutting tool.

Figure 2:
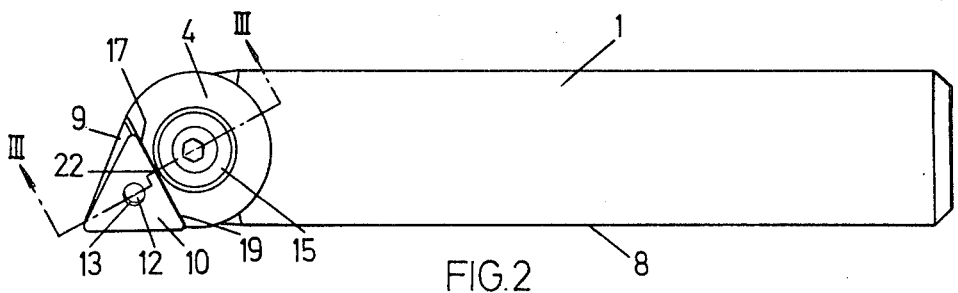
Figure 3:
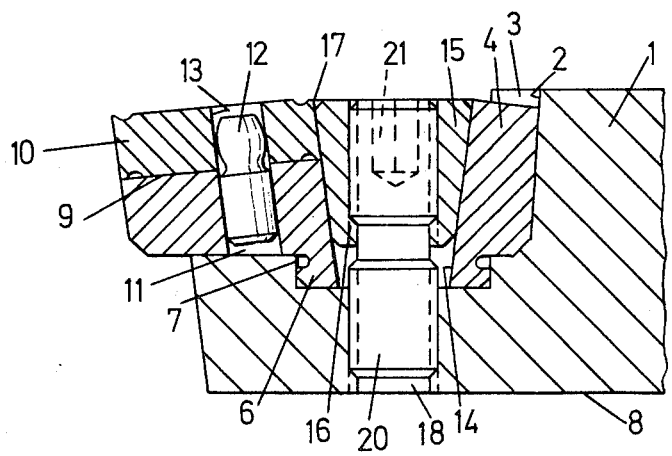
Figure 4:
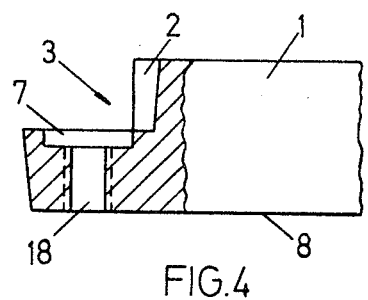
Figure 5:
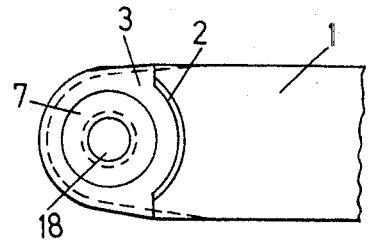
Figure 6:
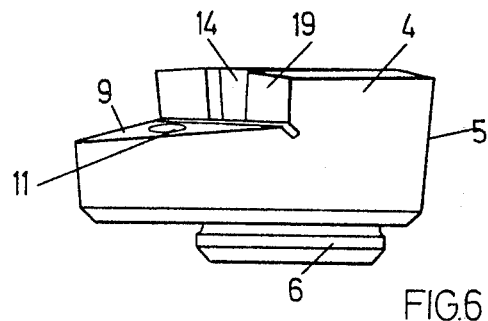
Figure 7:
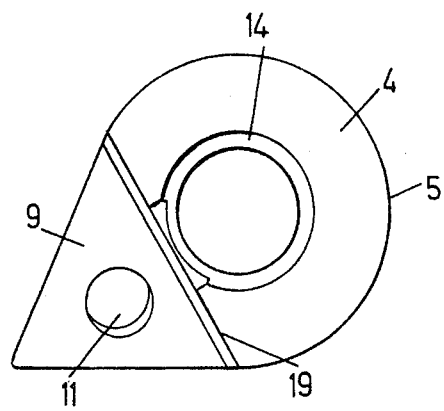

The invention will now be described by way of example with reference to the accompanying drawings in which:

FIG. 1 is a side view of a tool according to the invention in the form of a lathe turning tool, and comprising a holder and insert, FIG. 2 is a plan view of the tool shown in FIG. 1, FIG. 3 is a section on a larger scale along the line III—III in FIG. 2, FIG. 4 is a part-sectional view of the front end of the holder according to FIG. 1 with the insert removed, FIG. 5 is a plan view of the holder shown in FIG. 4, FIG. 6 is a side view on a larger scale of an insert removed from the holder and FIG. 7 is a plan view of the insert shown in FIG. 6.

In the illustrated embodiment a recess 3 bounded by a conical wall 2 is provided at the front end of a holder 1 of for example rectangular cross-section so as to accommodate an insert 4. A portion of the boundary of the latter is provided with a corresponding conical boundary surface 5 and the insert has a downwardly depending attachment 6, which engages in a hole turned in the holder 1. The forward part of the insert 4 has a bearing surface 9 which slopes in relation to the underside 8 of the holder 1 (FIGS. 6 and 7) and serves to accommodate a triangular metal turning tool 10 (FIGS. 1 to 3). The forward part of the insert can however be given a suitably different shape to accommodate other forms of cutting tool. A peg 12 with a ball head is forced into a bore 11 in the insert perpendicular to the upper bearing surface 9 and consequently inclined to the underside 8 of the holder 1, and the ball head engages in a central aperture 13 of the cutting tool 10 to form an abutment when the tool is clamped.

Adjacent the bearing surface 9 for the cutting tool 10 the insert is provided with an outwardly conically flared recess 14, i.e., the recess is flared towards the upper side of the insert, and accommodates a conical clamping member 15 provided with a central threaded bore 16. In the embodiment shown the recess 14 opens out on to the bearing surface 9 for the cutting tool 10 (see FIG. 6), so that one part of the periphery of the clamping member 15 can be brought to bear against a lateral surface 17 of the cutting tool 10. At the side of the recess 14 for the clamping member the insert 4 includes a fixed bearing surface 19 for the cutting tool which is to be clamped in position. The conicity of the recess 14 may be slightly different from that of the clamping member 15. The clamping member may also be wedge-shaped, in which case the recess in the insert is shaped to correspond.

The threaded bore 16 of the clamping member 15 is aligned with a threaded bore 18 in the holder 1 so that the clamping member 15 can be fixed in the holder 1 by means of a clamping bolt 20 engaging in both threaded bores. The clamping bolt 20 may for example be provided with an internal hexagonal recess 21 or equipped in any other way for operation by means of a key. One of the two screwthreads of the bores 16, 18 and of the corresponding parts of the bolt 20 is a right-hand thread and the other a left-hand thread. In this connection it may also be of advantage to arrange for the pitch of the threads to be different, for example to use a metric standard thread with the usual pitch for the bore 18 in the holder and the corresponding part of the clamping screw 20 and to use a smaller pitch for the thread of the bore 16 in the clamping member and for the corresponding portion of the clamping screw 20, say a pitch of 1 mm with a thread diameter of 8 mm as compared with the usual pitch of 1.25 mm with the same rated diameter.

On screwing up the clamping screw 20 the cutting tool 10 is firmly clamped to the insert 4 by means of the clamping member 15 and the insert itself is also firmly clamped to the holder 1.

As can be seen from FIG. 2, the region of application 22 of the clamping member 15 against the cutting tool 10 and the fixed bearing surface 19 on the insert acting as a second abutment for the cutting tool 10, both come to lie against the same lateral surface 17 of the cutting tool 10. The peg 12 forming the first abutment for the cutting tool is so offset in the direction of this lateral surface 17 and at right-angles thereto in relation to the zone of application 22, that it forms a central leverage point. When the clamping member 15 is tightened, pressure is applied at the region 22 against the cutting tool 10, causing the latter to bear against the peg 12 and owing to the lever action it is forced against the fixed bearing surface 19 of the insert, producing a reliable clamping action.

The clamping action on the cutting tool 10 may be released by slightly unscrewing the clamping screw 20, thus enabling the cutting tool to be turned or to be replaced. Moreover, by unscrewing the clamping screw somewhat the insert 4 itself can also be loosened sufficiently to be rotated axially in the recess 3 of the holder 1 about the bore 18, so as to change the angle of application of the cutting tool 10. After again tightening up the clamping screw 20 all the members are again fixed together as a rigid unit.

I claim:

1. A machining tool, comprising a holder and an insert having a bearing surface for a tool member, said insert being adapted to be axially rotatably mounted in a recess formed in the holder and to be clamped in a desired position in the holder by means of a set screw, said insert being provided with an outwardly flared recess adjacent to said bearing surface and with a tapered clamping member adapted to fit in said flared recess to be fixed by said set screw whereby the clamping member can engage directly against one side of the tool member to be clamped and the tool member and the insert can be clamped simultaneously to the holder, said machining tool having two abutments provided to support the tool to be clamped, one of the abutments being formed by a peg or the like engaging in an aperture in the tool member and the other abutment being formed by a fixed bearing surface on the insert adjacent said tapered recess so that the region of application of the clamping member against the tool member and the fixed bearing surface face the same side of the tool member to be clamped and the peg or the like forms a point of leverage.

2. A machining tool according to claim 1, wherein the clamping member consists essentially of the clamping screw itself.

3. A machining tool according to claim 1, wherein the clamping member includes a through-bore for the clamping screw.

4. A machining tool according to claim 1, wherein the clamping screw includes a right-hand thread and a left-hand thread one of which threads is adapted to engage in a threaded bore of the holder and the other of which threads is adapted to engage in a threaded bore in the clamping member.

5. A machining tool according to claim 4, wherein said threads are of different pitch.

6. A machining tool according to claim 1, wherein the insert comprises a conical boundary surface portion and the recess in the holder is of corresponding conicity.

7. A machining tool according to, claim 1 wherein the insert comprises an attachment engaging in a further recess in the holder.

8. A machining tool according to, claim 1 wherein the bearing surface for the tool member is inclined in relation to an under surface of the holder.

* * * * *